March 19, 1929. H. M. ROBERTSON 1,706,128
APPARATUS FOR TREATING MATERIALS
Filed June 18, 1927 6 Sheets-Sheet 2
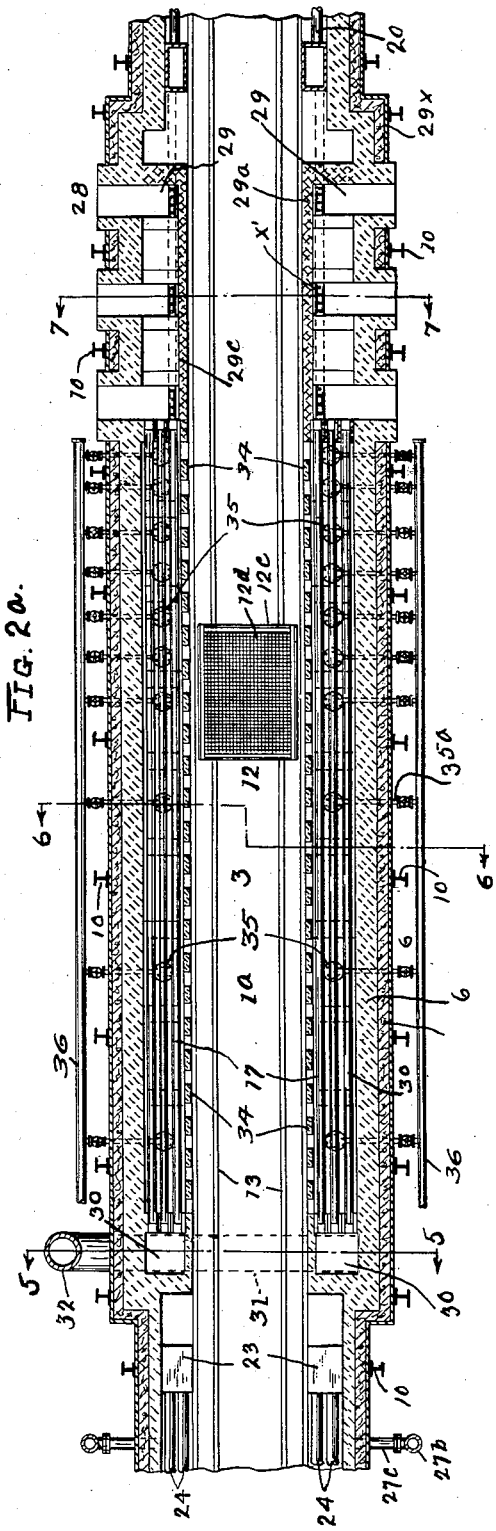
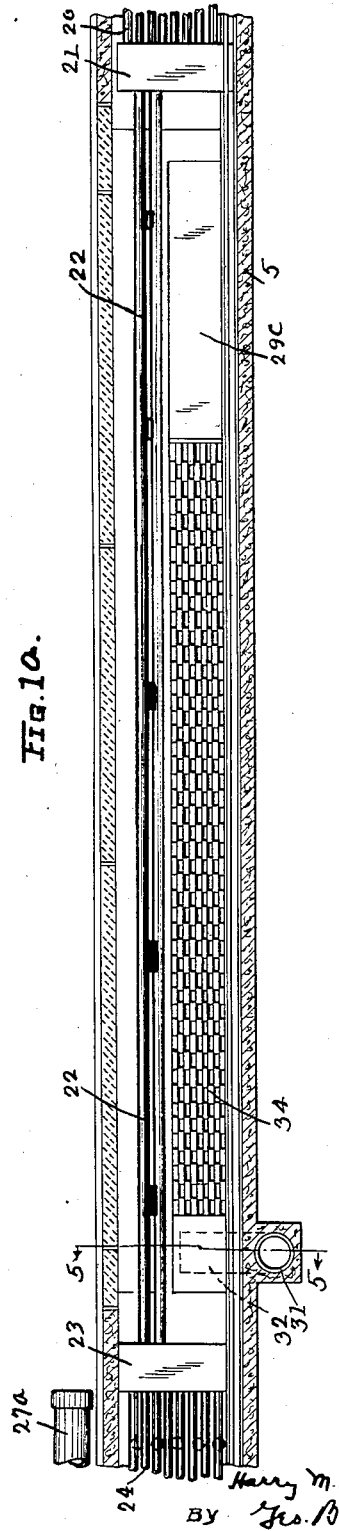
Inventor
Harry M. Robertson
BY Jas. B. Pitts
Attorney

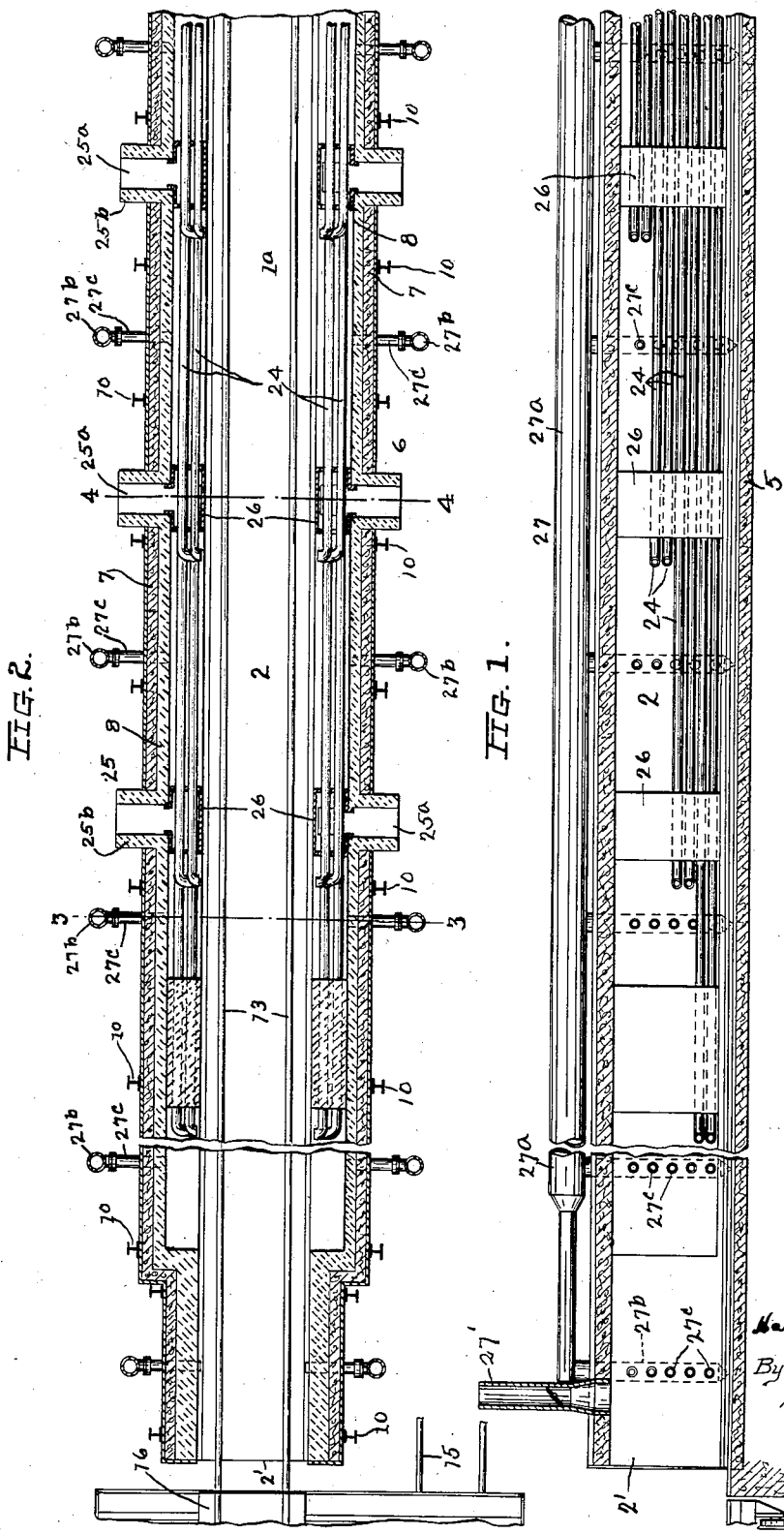

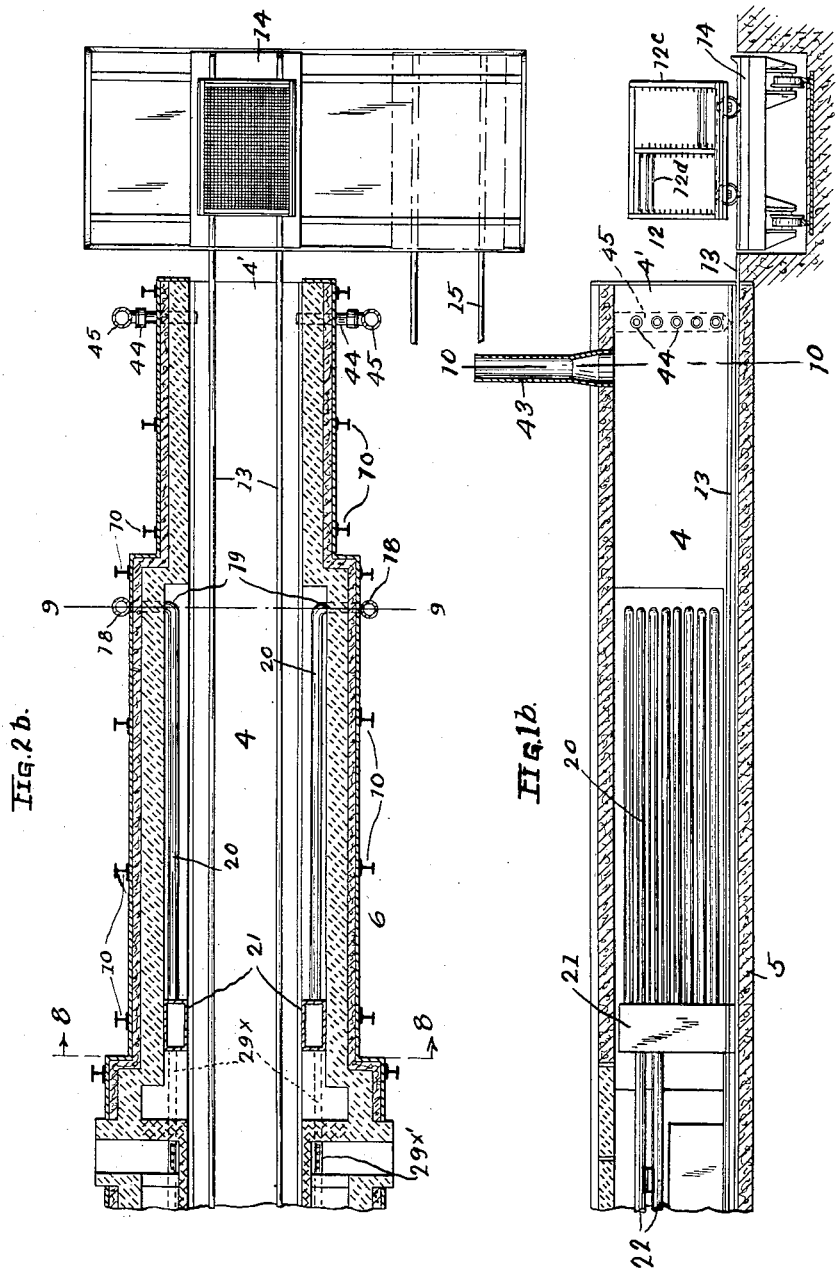

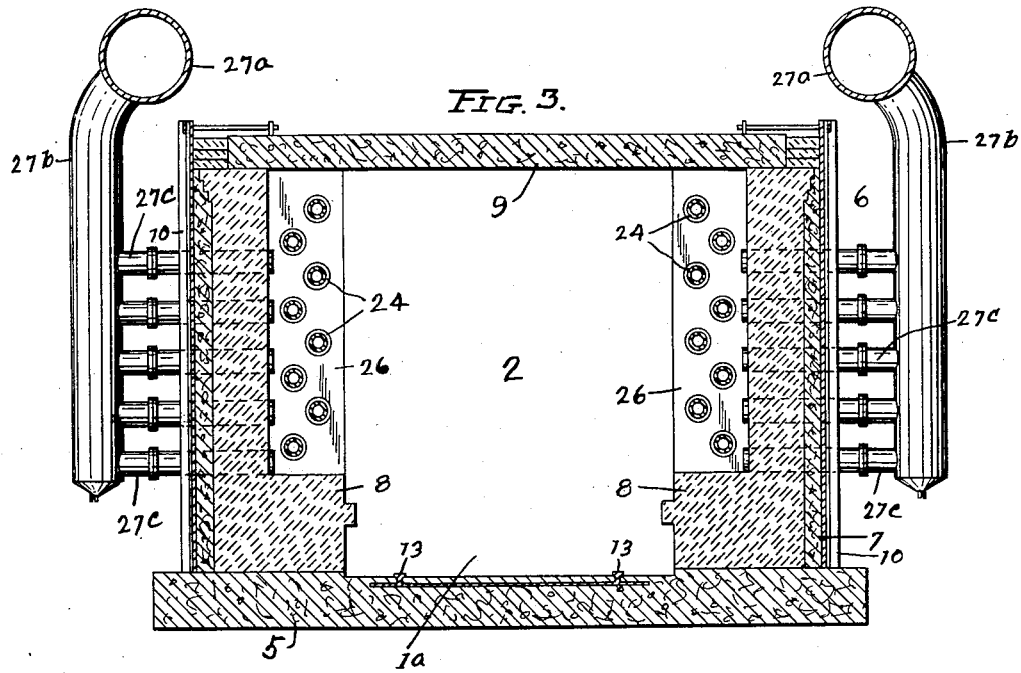
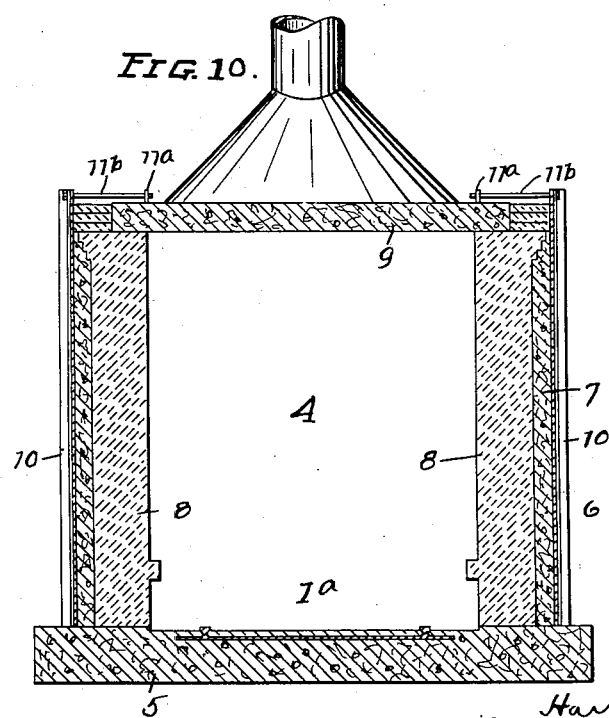

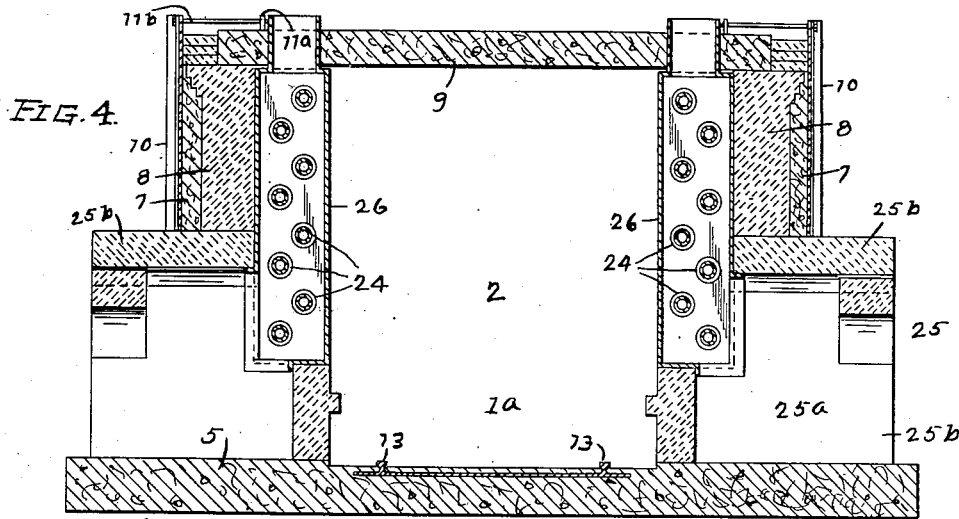
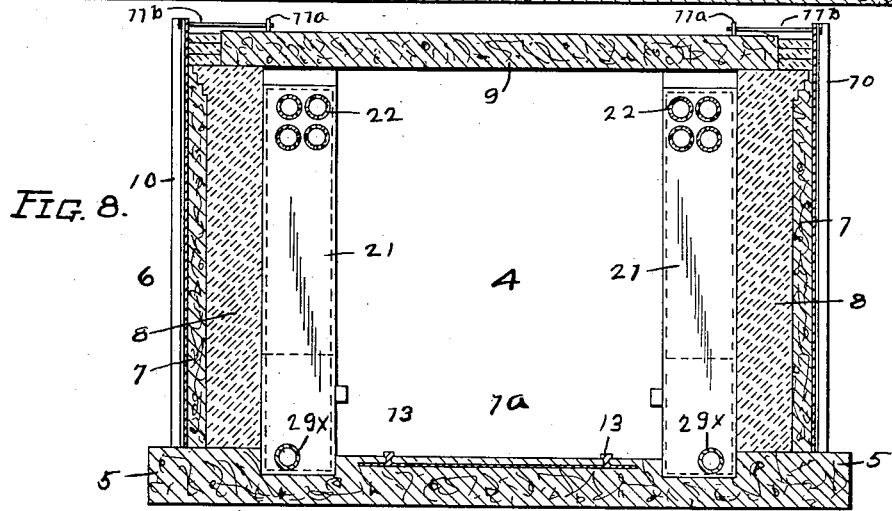
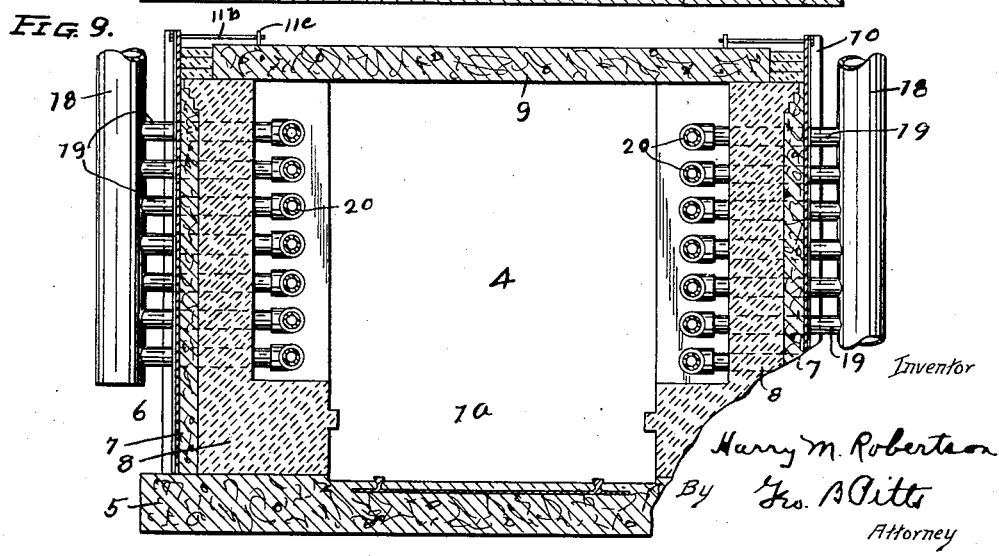

March 19, 1929.   H. M. ROBERTSON   1,706,128
APPARATUS FOR TREATING MATERIALS
Filed June 18, 1927   6 Sheets-Sheet 6
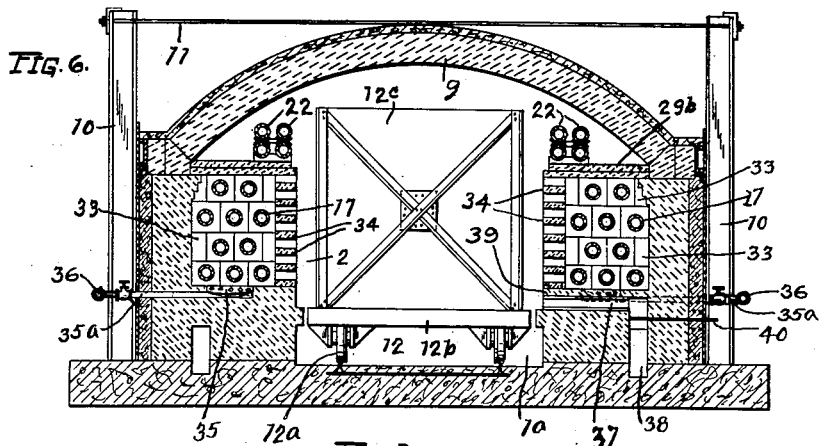
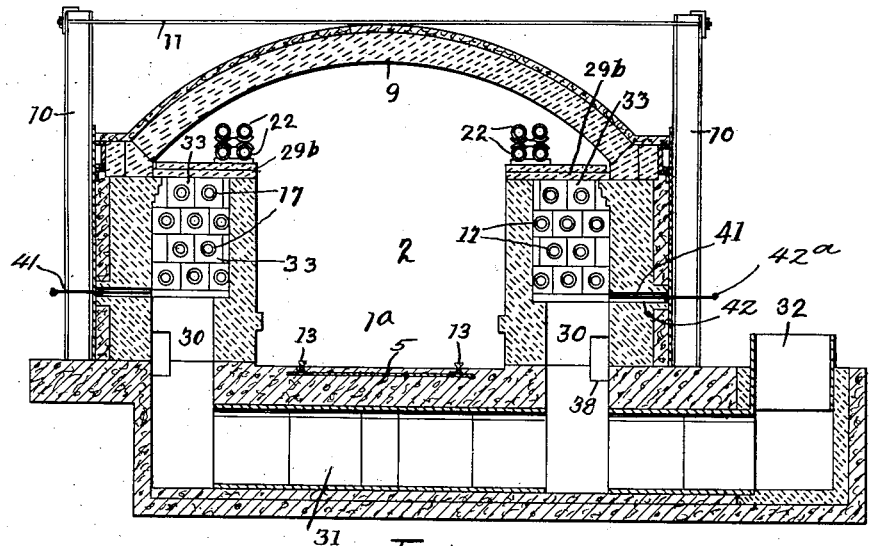
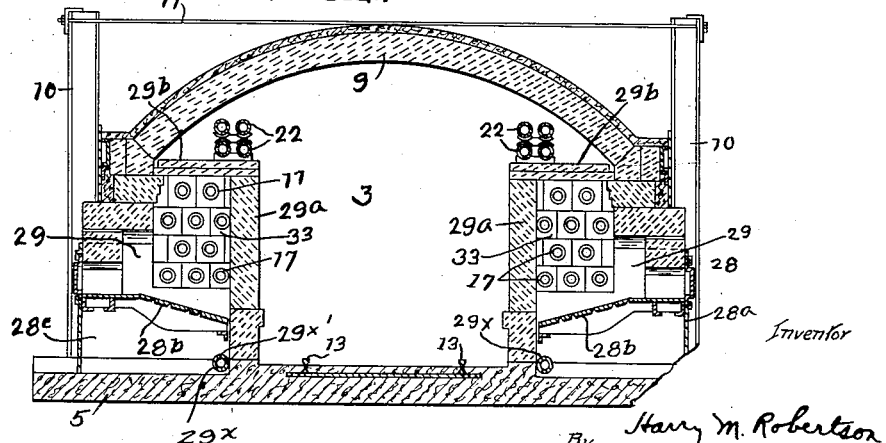
Inventor
Harry M. Robertson
By Geo. B Pitts
Attorney Patented Mar. 19, 1929.

1,706,128

UNITED STATES PATENT OFFICE.

HARRY M. ROBERTSON, OF CLEVELAND, OHIO.

APPARATUS FOR TREATING MATERIALS.

Application filed June 18, 1927. Serial No. 199,841.

This invention relates to apparatus for treating materials, for example, materials containing hydrocarbons.

One object of the invention is to provide an improved process and apparatus capable of recovering hydrocarbons in materials, whether occurring therein in their natural state or mixed therewith.

Another object of the invention is to provide an improved process of treating hydrocarbon containing materials and particularly products ordinarily considered waste.

Another object of the invention is to provide an improved process capable of treating waste hydrocarbon containing materials, such as distress coal or prepared briquets made therefrom in such manner that hardened fuel low in ash and smoke ingredients is economically produced in large quantities.

Another object of the invention is to provide an improved process of subjecting hydrocarbon containing material to different degrees of temperatures to first vaporize substantially all of the volatile matters which may be contained therein, then to gasify any and all gases remaining in the material, if desired, and finally hardening the bodies of material, whereby the same may be handled with shovels, buckets and shipped in bulk form without breakage and waste.

Another object of the invention is to provide an improved apparatus for treating materials capable of producing a product that is low in ash and smoke generating ingredients and also hardened and conditioned for handling without danger of waste.

Other objects of the invention will be apparent to those skilled in the art to which my invention relates from the following description taken in connection with the accompanying views, wherein Figs. 1, 1ª, 1ᵇ, show in vertical section an apparatus embodying my invention and capable of use in carrying out my improved process.

Figs. 2, 2ª, 2ᵇ, are horizontal sections through the apparatus.

Fig. 3 is a section on line 3—3 of Fig. 2.
Fig. 4 is a section on line 4—4 of Fig. 2.
Fig. 5 is a section on line 5—5 of Fig. 2ª.
Fig. 6 is a section on line 6—6 of Fig. 2ª.
Fig. 7 is a section on line 7—7 of Fig. 2ª.
Fig. 8 is a section on line 8—8 of Fig. 2ᵇ.
Fig. 9 is a section on line 9—9 of Fig. 2ᵇ.
Fig. 10 is a section on line 10—10 of Fig. 1ᵇ.

My improved process is adapted for the treatment of hydrocarbon containing materials, for example (a) oil shale where the primary purpose is the recovery of the oil content thereof and (b) material known as culm, coal powder, crushed coal, slack and distress coal. This latter material may be in the form of briquets and in the use of this latter term I have in mind bodies or lumps of such material whether broken, compressed, cut or otherwise formed into sections or shapes.

The material to be subjected to my process may be previously mixed with oil and treated to eliminate foreign matters and formed into relatively small bodies. One example of such treatment, such as I have in mind, is known as the Trent process. My improved process and apparatus are adapted for heat treating any of these materials whether in their raw condition or previously treated in the manner referred to, to eliminate their oil or hydrocarbon content and certain gases therein and to harden and condition the briquets, thereby enabling these bodies to be readily handled with shovels and other devices without crumbling or waste and efficiently burned as fuel with relatively low residue and without generating an undue amount of smoke.

In the drawings, 1 indicates as an entirety a retort the walls of which form a preheating chamber 2, a main heating chamber 3 and a cooling chamber 4, these chambers being disposed in contiguous relation, whereby batches of the material or briquets may be successively conveyed through the chambers and finally discharged from the cooling chamber 4. The inlet end of the chamber 2 is provided with a suitable door (not shown) which is opened to admit each batch of material and the outlet end of the chamber 4 is provided with a suitable door (not shown) which is opened to permit each batch to be passed from the chamber.

5 indicates a suitable bed or foundation preferably formed from reinforced concrete and having an area equal to the length and width of the retort 1. 6 indicates as an entirety the side walls of the chambers 2, 3, 4, having an outer wall portion 7 formed of bricks and a secondary or inner wall 8 formed of suitable refractory material. 9 indicates the roofs for the chambers 2, 3, 4. That portion of the roof which is over the main heating chamber 3 may be formed of fire brick to resist the high temperatures in this zone or chamber and covered with suitable insulating material, (see Figs. 5, 6 and 7). The side walls 6 for the chambers are strengthened by a plurality of spaced uprights 10, suitably fixed in the bed 5. At their upper ends certain of the uprights are tied to each other by rods 11 and certain other of the uprights are connected to fixed devices 11$^a$ by rods 11$^b$. The lower portions of the walls 8 are widened inwardly to provide benches which form between them a channel 1$^a$ through which suitable wheeled supports or trucks 12 move, suitable tracks 13 being provided on the bed to guide the wheels 12$^a$ of the supports. The supports 12 comprise a base 12$^b$ and a frame 12$^c$ consisting of upright end and intermediate members having a plurality of horizontal guides for removably holding trays 12$^d$ on which the bodies or briquets of material are supported. The tracks 13 extend continuously from a point outside the inlet 2' to the preheating chamber 2 to a point beyond the outlet 4' from the cooling chamber 4. In operating the retort, supports 12 are successively loaded with the material or briquets and moved into the chamber 2, power in any suitable manner being applied to each support to move it into this chamber, each support acting on the support previously moved into the chamber to move it and the supports in front of it along the tracks 13. In this manner, the loaded supports are successively moved into the chamber 2 and through it and the chambers 3 and 4 and finally out through the outlet 4', where the conditioned material is removed from the supports 12. The unloaded supports 12 are preferably moved onto a transfer truck 14 by means of which they are transferred to a return trackway 15 and then moved onto a transfer truck 16, by means of which they are transferred to their loading position and in line with the tracks 13 entering the inlet 2' (see Figs. 1 and 2).

In the first step of my process each batch or load of material, while moving a predetermined distance from end to end of the chamber 2, is subjected to a uniform degree of temperature high enough to vaporize those hydrocarbons contained in the material (particularly those present in liquid condition), desired to be recovered, these vapors being discharged from the chamber 2 by means of a suction fan and collected, whereby they may be, if desired, suitably distilled and utilized. In the next step of my process each batch of material while moving a predetermined distance from end to end of the main heating chamber 3, is subjected to a uniform degree of temperature, preferably a higher degree of temperature than that maintained in the chamber 2, the effect of which is to (a) gasify the hydrocarbons remaining in the material and (b) harden the material at least its outer portions to enable it to be handled with shovels, scoops, power operated buckets and gravitated into bins and the like without danger of crumbling. In this step I preferably subject the material to moisture, as by the injection of steam into the space surrounding the pipes or conduits (indicated at 17) for the products of combustion, to facilitate and increase or enhance the transfer of heat by radiation to the material, as well as to prevent ignition of the material being treated. In the next step of my process, each batch of material passes through the cooling zone or chamber 4, which has a relatively low temperature. In the final step of my process, each batch of material is preferably sprayed with steam which tends to further lower its temperature before passing through the outlet 4', and sets up a back pressure to prevent primary air entering the chamber when the outlet door is opened. For example, in carrying out my process, I may subject the material while passing through the chamber 2 to a temperature of approximately 550 degrees F., and while passing through the main heating chamber, I may subject the material to a temperature of approximately 1,000 degrees F., and while passing through the cooling chamber the material may be subjected to a temperature varying from 800 to 300 degrees F.

In carrying out these steps the retort is constructed to effect heating, whereby vaporization and gasification of the hydrocarbons takes place in the most economical manner and with relatively large capacity for any given size of retort and furthermore, I am enabled to (a) effect these steps without contact of the combustible medium or the products of combustion therefrom with the material and (b) supply large volumes of heated air to effect heating of the material and vaporizing of the volatile contents thereof and conveying away in a rapid manner the resulting vapors.

18 indicates a pair of air supply conduits disposed on the outer sides of the walls 6 constituting the cooling chamber 4 and relatively near the outlet end thereof. The conduits are connected to a main supply conduit (not shown) and this latter conduit is connected to the discharge end of a blower (not shown) to supply air under pressure to the conduits 18. 19 indicates a series of pipes connected to each conduit and leading through the adjacent walls 7, 8, of the chamber 4 and each connected at its inner end to an air circulating pipe 20 extending longitudinally of the chamber 4 and preferably horizontally toward its inlet end. In this form of construction it will be seen that at either side of the space or channel of the chamber 4 traversed by the batches of material and throughout a major portion of the length of the chamber there is a vertical tier of air circulating pipes, this arrangement permitting the air that is forced therethrough to absorb a relatively large percentage of the heat units radiating from the material. Furthermore, by effecting a positive circulation of the air through the pipes 20, a wide temperature difference is maintained between the inner surfaces of the pipes and their outer surfaces and this temperature difference induces a rapid transfer of the heat through the walls of the pipes and such transfer tends to increase the rate of cooling of the material. In the form of construction shown, the resulting temperature in the chamber 4 due to the supply of air through the pipes 20 will vary from 800 to 300 degrees F. The inner ends of each series of pipes 20 are connected to a manifold 21 arranged at the inner end of the chamber 4 or at or adjacent the point where the heating and cooling chambers 3, 4, join or merge. 22, 22, indicate series of air circulating pipes, each series being connected at one end to one of the manifolds 21 and extending through the main heating chamber 3 and connected to a manifold 23 disposed at the inner end of the preheating chamber 2 or at or adjacent the point where this chamber and the chamber 3 are joined or connected. In this arrangement the air which has been previously heated in passing through the chamber 4 is brought up to a relatively high temperature by the high degree of temperature in the main heating chamber, so that it can be effectively utilized to heat the chamber 2 to the desired degree and thus heat the material as it passes therethrough sufficiently to cause vaporization, as already set forth. Each series of pipes 22 may be arranged in the upper portion of the chamber 3 with the pipes in each series disposed in spaced relation to each other to permit the circulation around and between them of the heated air and gases in this chamber. 24, 24, indicate series of air circulating pipes, those of each series being connected at their inner ends to one of the manifolds 23 and leading therefrom horizontally and longitudinally of the chamber 2 and preferably in staggered relation (see Fig. 4), their free ends being open and discharging the heated air at spaced points (preferably at uniformly spaced points) from end to end of the chamber. The end portion of each pipe 24 may be curved inwardly to direct the heated air toward the material. In the preferred construction, I provide in each series eight air supply pipes 24, two of which terminate and discharge the heated air at each point. 25 indicates supplemental or auxiliary heating means associated with the heating chamber 2. These heating means are of the muffle type to prevent contact of the products of combustion with the material being treated or admixture with the vapors being distilled therefrom. The auxiliary heating means 25 may comprise one or more fire boxes in each wall 6 of the chamber 2 constructed to permit the combustion of coal, coke, oil or gas. As shown in Fig. 4, each box 25 comprises a combustion chamber 25$^a$ formed between side and top walls 25$^b$ incorporated in the walls 7, 8, the inner and upper portion of the chamber having an opening connected with an opening in the lower portion of a flue 26, so that the heat and products of combustion from the combustion in the chamber 25$^a$ may pass up through the flue, its upper end extending through the roof 9. Each flue 26 rests on the lower inwardly extending portion of the wall 8 and against the inner surface of its upper portion. Each flue 26 is preferably of rectangular shape in cross section (see Fig. 2) and its front and rear side walls are formed with aligned openings through which the pipes 24 extend, whereby the air therein may be re-heated up to or maintained at the desired degree of temperature. The supplemental heating means 25 are preferably disposed in spaced relation longitudinally of the chamber 2 so that they may compensate for any heat losses as the air in the pipes circulates toward their discharge ends. The flues 26 are preferably formed of metal so that their walls will radiate a large number of heat units into the chamber and thus assist in maintaining the temperature therein. It will be understood that each of the auxiliary heating means 25 is independently operated and controlled, so that none thereof need be operated or any one or more may be set in operation as conditions may require at any time depending on the temperature desired to be maintained in the chamber 2.

27 indicates as an entirety the discharge and collecting means for the vapors distilled from the material while passing through the chamber 2. Of these means, 27$^a$ indicates a conduit along either side wall 6 near its upper end and leading to a suitable discharge conduit to which a suction device (not shown) is connected to induce a suction effect within the chamber 2. Each pipe 27$^a$ is connected to a series of up-legs 27$^b$ and each of the latter is connected to a series of inturned receiving pipes 27$^c$ extending laterally through the adjacent wall 6, their inner ends being open so as to receive the vapors and excess air discharged from the pipes 24. As will be understood from Fig. 2, the series of pipes 27$^c$ are spaced along each wall 6, preferably at points substantially midway between the discharge ends of adjoining pairs of pipes 24. 27' indicates a flue leading through the roof 9 for the chamber 2 near its inlet end, the purpose of the flue being to permit escape of air flowing into the chamber 2 when the inlet door therefor is opened to admit a batch of material.

28 indicates a plurality of heat supply means along the opposite sides of the space 1$^a$ in the chamber 3, three such chambers being shown at each side. Each heat supply means preferably comprises a suitable furnace 28$^a$ having a grate 28$^b$ above an ash pit 28$^c$ and a combustion space 29, which merges with the combustion spaces of the adjoining furnaces. The furnaces shown are adapted for the burning of coal or coke, but it will be obvious that the heat may be supplied by the combustion of oil or gas. The walls of each furnace are incorporated in the side walls 7, 8, the furnace back 29$^a$ and top wall 29$^b$ serving to prevent flow of the products of combustion into the chamber 3. For the purpose of inducing a draft in each furnace, an air supply pipe 29$^x$ connected to the adjacent manifold 21 extends along the bed 5 and through the ash pits 28$^c$ of the adjacent furnaces (see Fig. 7) and those portions of the pipe within the pits are formed with air discharge ports 29$^{x'}$. The flue pipes 17 serve to circulate the products of combustion through the chamber 3, whereby the heat units in the products may radiate therefrom to heat the material to the desired degree and gasify other hydrocarbon compounds therein as the material passes through the chamber. Each series of pipes 17 at one end extend through the inner side wall of the innermost furnace 28$^a$ (see Figs. 6 and 7) to receive the products of combustion from the connected combustion chambers 29; at their opposite ends the pipes 17 lead into a discharge manifold or space 30, connected with a conduit 31 arranged transversely of the retort below its bed 5, which conduit leads to a chimney 32 (a portion of which is shown in Fig. 5). The pipes 17 extend through spaced transverse piers 33 which support them between their ends, the piers being formed of suitable refractory blocks. The chimney 32 is preferably provided with a suction means to set up a suction effect upon the products of combustion, whereby their circulation through the pipes 17 is rapid to insure heating of the pipe walls and radiation of heat therefrom. In order that the circulating pipes 17 may have maximum wall surface exposure in the main heating chamber 3, the furnaces 28$^a$ in each side wall 6 are arranged side by side at or near the outer end of the chamber 3 and the manifolds 30 are arranged at the inner end thereof. As clearly shown in Figs. 5, 6 and 7, the pipes 17 of each series are in horizontal rows and those in each row are staggered with reference to the pipes 17 in the rows above and below them. By this arrangement the pipes are spaced from each other to permit the free circulation of air and steam across and between them. Each series of pipes 17 is separated from the space 1$^x$ by a vertically arranged checkered wall 34, which serves to uniformly distribute the heat radiating from the pipes. I prefer to supply moisture into the space through which the pipes 17 extend to facilitate and increase the transfer of heat to the material as it passes through the chamber 3, as well as to prevent ignition of the material. The moisture is preferably supplied by injecting steam in sprayed condition into the lower portions of the pipe containing spaces. For this purpose I provide in each pipe containing space below the adjacent pipes a plurality of steam spraying nozzles 35, preferably of ring shape, each nozzle being connected by a valved controlled pipe 35$^a$, connected to a steam supply pipe 36. The steam supply nozzles 35 are spaced along either side of the main heating chamber 3, the number thereof being increased along that portion of the chamber adjacent the furnaces 28$^a$ so that by an excess amount of steam throughout that portion the temperature may be kept down to approximately that throughout the remaining portion of the chamber. It will be noted that the supply pipe for each nozzle 35 is controlled by a valve, so that the supply of steam in different portions of the chamber may be varied at will.

The discharge means for the gases given off from the batches of material as they move through the chamber 3 comprise a plurality of outlets 37 leading transversely through the thickened portions of walls 8 and connected to a conduit 38 extending longitudinally through this wall from a point adjacent the innermost furnace 28$^a$ to the adjacent discharge manifold 30, whereby the suction effect in the latter will draw from the chamber 3 the hydrocarbons gasified by the heat therein. The gas discharge outlets are in spaced relation along each wall 8 and are preferably disposed in a plane below the checkered wall 34 and pipe containing space, being separated therefrom by a refractory wall 39. Each outlet may be controlled by a valve device 40, so that the circulation of the products of combustion through the pipes 17 and the suction effect on the gases may be regulated as conditions may require.

41 indicates a valve disposed in each manifold 30 so as to cut off or regulate the discharge of the products of combustion from the pipes 17 into the conduit 31. The walls 7, 8, are formed with an opening 42 to receive the valve 41 when opened, a handle 42$^a$ being provided to operate the valve.

43 indicates an exhaust flue leading from the cooling chamber 4, permitting the escape of any heated gases which may flow into this chamber. 44 indicates series of steam nozzles arranged in each side wall 6 near the outlet 4, each series being connected to a supply pipe 45. The steam supplied by the nozzles 44 serves to set up pressure within the chamber 4 to keep air from entering therein at the time the door for the outlet 4' is opened.

From the foregoing description it will be noted that (a) the batches of material are conveyed through contiguous chambers first to vaporize certain or all of the volatile hydrocarbons in the material and next to gasify other hydrocarbons therein, and (b) the vapors and gases are carried off through separate discharge means; also that a large volume of air is supplied to the vaporizing chamber to insure vaporization and carrying off of the vapors and that this air is heated first by the heat radiating from the material and then by the heat in the main heating or gasifying chamber to insure economy in operation. Although the heated air utilized to heat the preheating and vaporizing chamber is heated by the heat in the gasifying chamber, it is passed therethrough and its temperature raised without contact or mixture with the products of combustion, the heat of which effects gasification in this chamber, or the gases generated from the batches of material; and likewise the products of combustion are conveyed through the gasifying chamber without contact with the material being treated or admixture with gases therefrom.

By varying the temperature in the gasifying chamber the surfaces of the briquets may be hardened to varying depths; by increasing the temperature the briquets may be hardened all the way through.

To those skilled in the art to which my invention relates many changes in construction and widely differing embodiments and applications of the invention will suggest themselves without departing from the spirit and scope thereof. My disclosures and the description herein are purely illustrative and are not intended to be in any sense limiting.

What I claim is:

1. In a tunnel retort for the distillation of solid carbonaceous material, the combination of contiguous preheating, heating and cooling chambers through which batches of material are successively passed, pipes extending from the latter chamber through the heating chamber into the preheating chamber and opening into said preheating chamber, means for supplying air to said pipes whereby air is conveyed through said chambers, combustion chambers arranged at the outlet end of said heating chamber, pipes extending from the combustion chambers for conveying the products of combustion through said heating chamber, means for conveying away the products of combustion, and means for exhausting the vapors from said preheating chamber.

2. A tunnel retort for the distillation of solid carbonaceous material as claimed in claim 1 in which the discharging ends of the air supplying pipes terminate at spaced points throughout said preheating chamber.

3. A tunnel retort for the distillation of carbonaceous material as claimed in claim 1 in which an auxiliary means are provided for heating the air in the air supply pipes while flowing through said preheating chamber.

4. A tunnel retort for the distillation of carbonaceous material as claimed in claim 1 in which are provided means for conveying away the gases driven off from the material while passing through the heating chamber.

5. A tunnel retort for the distillation of carbonaceous material as claimed in claim 1 in which are provided means for spraying moisture into that portion of the heating chamber through which extend the pipes for the products of combustion.

6. In a tunnel retort for the distillation of carbonaceous material, the combination of contiguous preheating, heating and cooling chambers through which batches of material are successively passed, longitudinally extending passages at either side of said heating chamber, having means for distributing heat to the material as it passes therethrough, a series of pipes extending through each said passage, combustion means at the outer end of said heating chamber having its combustion chamber connected to said series of pipes, a conduit for gases driven off from the material while passing through said heating chamber, air pipes in said cooling chamber, means for supplying air to said air pipes, means for conveying the air in said pipes through said heating chamber and discharging it into said preheating chamber, and discharge means for the products of combustion and gases from said conduit.

7. In a tunnel retort for the distillation of carbonaceous material, the combination of contiguous preheating, heating and cooling chambers through which batches of material are successively passed, passages extending longitudinally of said heating chamber at either side of the channel through which the batches of material pass and having means for distributing heat thereto, a series of pipes extending through each said passage, combustion means at the outer end of said heating chamber and having its combustion chamber connected to said series of pipes, a conduit for gases driven off from the material while passing through said heating chamber, air pipes in said cooling chamber, means for supplying air to said air pipes, means for conveying the air in said pipes through said heating chamber and discharging it into said preheating chamber, means for re-heating the air before it is discharged, and means for discharging the products of combustion and gases driven off from the material.

8. A tunnel retort for the distillation of solid carbonaceous material as claimed in claim 6 in which are provided means for spraying steam onto the pipes through which flow the products of combustion.

9. In a tunnel retort for the distillation of carbonaceous material, the combination of contiguous preheating, heating and cooling chambers through which batches of material are successively passed, benches extending along either side of said heating chamber and providing above them heat circulating spaces, combustion means at the outlet end of said heating chamber, an exhaust flue at the opposite end of said heating chamber, a discharge conduit extending longitudinally through each bench and having ports leading from the heating chamber, said conduits being connected to said flue, pipes for the products of combustion leading from said combustion means through said heat circulating spaces and connected to said flue, pipes extending longitudinally through said chambers and having their discharge ends opening into said preheating chamber, means for supplying air to said pipes at a point within said cooling chamber, and means for exhausting the air and vapors from said preheating chamber.

10. In a tunnel retort for the distillation of carbonaceous material, the combination of contiguous preheating, heating and cooling chambers through which batches of material are successively passed, benches extending along either side of said heating chamber and providing above them heat circulating spaces, combustion means at the outlet end of said heating chamber, an exhaust flue at the opposite end of said heating chamber, a discharge conduit extending longitudinally through each bench and having ports leading from the heating chamber, said conduits being connected to said flue, pipes for the products of combustion leading from said combustion means through said heat circulating spaces and connected to said flue, means at spaced points throughout each said heat circulating space for supplying moisture therein, pipes extending longitudinally through said chambers and having their discharge ends opening into said preheating chamber, means for supplying air to said pipes at a point within said cooling chamber, and means for exhausting the air and vapors from said preheating chamber.

11. In a tunnel retort for the distillation of solid carbonaceous material, the combination of contiguous preheating, heating and cooling chambers through which batches of material are successively passed, benches extending along either side of said heating chamber and providing above them heat circulating spaces, combustion means at the outlet end of said heating chamber, an exhaust flue at the opposite end of said heating chamber, a discharge conduit extending longitudinally through each bench and having ports leading from the heating chamber, said conduits being connected to said flue, pipes for the products of combustion leading from said combustion means through said heat circulating spaces and connected to said flue, means at spaced points throughout each said heat circulating space for supplying moisture therein, said supply means being arranged to supply a greater amount of moisture at the end of said spaces adjacent said combustion means than at their other ends, pipes extending longitudinally through said chambers and having their discharge ends opening into said preheating chamber, means for supplying air to said pipes at a point within said cooling chamber, and means for exhausting the air and vapors from said preheating chamber.

12. In a tunnel retort for the distillation of carbonaceous material, the combination of contiguous preheating, heating and cooling chambers forming a channel through which batches of material are successively passed, upper and lower walls extending longitudinally of said heating chamber at either side of the material channel to form heat circulating and supply spaces, combustion means at the outlet end of said heating chamber, sets of conduits connected with said combustion means and leading longitudinally through said spaces, means for conveying air from said cooling chamber through said heating chamber and discharging it in said preheating chamber, the supply of air to said conveying means being exterior of said chambers and that portion of said means in said heating chamber comprising pipes disposed on said upper walls, means for carrying off the products of combustion from said conduits, and means for exhausting vapors and air from said preheating chamber.

In testimony whereof, I have hereunto affixed my signature.

HARRY M. ROBERTSON.